3,183,199
PETROLEUM WAX POLYVINYLSTEARATE COMPOSITIONS
John J. Alexander, Munster, Ind., assignor to Standard Oil Company, Chicago, Ill., a corporation of Indiana
No Drawing. Filed Dec. 23, 1960, Ser. No. 77,854
6 Claims. (Cl. 260—28.5)

This invention relates to a paper coating composition. More particularly it relates to a paper coating composition comprising a mixture of refined paraffin wax, polyethylene and a vinyl stearate polymer.

Paraffin wax is principally used today as a coating for paper or paper-board products. Waxed paper has the special attribute of being very resistant to moisture transfer. So it is used as an outerwrap for many packages to protect the contents thereof either from absorption of or loss of moisture therefrom. Consequently, the gloss characteristics of waxed paper is of special importance when such paper is used as an overwrap in the packaging of many products. Gloss is very important when waxed paper has been color printed, for such paper is usually used as packaging material for products which are sold in self-service stores. Therefore appearance is critical. Waxed paper having good initial gloss can normally be prepared by applying a film of wax to the paper at a temperature well above the wax melting point and cooling very rapidly by immersion in cold water. However, such waxed paper while having good initial gloss often loses it after a few days or weeks. Further, any tendency to lose gloss is usually accentuated by varying storage temperatures. The modification of wax to inhibit the loss of the gloss of waxed paper is therefore of value.

Many materials have been added to wax in recent years to improve one or more of its functional properties. For example, polyethylene has been found to be a beneficial additive for improving many of the functional properties of paraffin wax, one of which is maintenance of the gloss of waxed paper. However, the addition of polyethylene to paraffin wax has created new problems. By way of illustration, it has been found that the storage stability of polyethylene in wax compositions is poor. That is to say that when the polyethylene-wax product is stored in bulk the polyethylene tends to settle out. Also, such wax-polyethylene compositions have much greater viscosities than wax from which made. Consequently, the application of such compositions to paper is rendered more difficult. Another problem is the formation of haze or cloud in the wax-polyethylene compositions. Molten paraffin wax is normally clear. However, as has been described in the literature and patents during recent years, polyethylene is insoluble or immiscible with most of the well-known chemicals and is difficult to incorporate into wax. Consequently, normal polyethylene-wax compositions are heterogeneous and being heterogeneous have differential solidification temperatures. That is to say, that when such compositions are prepared at elevated temperatures, the cooling thereof causes the polyethylene to solidify at a temperature above the melting point of the wax. The temperature at which initial precipitation occurs is referred to as the cloud point. Such compositions are hazy for the polyethylene is dispersed as small particles in the wax at temperatures between the cloud point and solidification temperature of the blend. Haze is undesirable for the blend must be kept at temperatures at least 15° F. above the cloud point at the time of application. Otherwise the coating will be nucleated and discontinuous and of greater opacity due to the small polyethylene particles. As a consequence of these problems, the wax and paper industries have been seeking means for producing homogeneous polyethylene-wax compositions which will be haze free and not exhibit cloud, have stability during storage, be free of viscosity increase, and retain gloss.

According to the present invention, it has been found that gloss-unstable paraffin waxes are substantially improved with respect to gloss stability, cloud, storage stability and viscosity by the incorporation therein of small but effective amounts of both polyethylene and vinyl stearate polymer. More particularly, the present invention comprises wax based paper coating compositions predominating in paraffin waxes having melting points within the range of from about 120° F. to about 145° F., preferably about 132/137° F. and a small amount of at least 0.05% of a low molecular weight polyethylene in combination with a small amount of at least 0.01% of a vinyl stearate polymer, and the total amount of said polyethylene and said vinyl stearate polymer being from about 0.06% to about 0.1%.

The polyethylene to be added in accordance with this invention should have an average molecular weight of about 1,000 to about 2,500, preferably 2,000. The vinyl stearate polymer should have an average molecular weight of from about 85,000 to about 95,00, preferably 90,000.

In the following example which is illustrative of the present invention, gloss stability was determined in accordance with the procedure published in TAPPI, vol. 37, p. 400, No. 9, September 1954. Briefly, initial gloss of a waxed paper specimen is measured by percent light reflectance. The specimen is then stored at 72° F. and 50% relative humidity for seven days after which percent light reflectance is again measured. Stability is determined by change in percent reflectance. The less the change, the greater the stability.

Wax blends were prepared in one kilogram quantities by first melting paraffin wax (M.P. 135/137° F.) and then blending in the desired polymer while heating. Homogeneous mixtures were obtained in 30 to 35 minutes at temperatures of 220–230° F. Paper stock was then coated with the various blends and subjected to gloss stability tests. Cloud point determinations were made for each of the blends. The blends prepared had the following compositions:

| Blend | Paraffin Wax, Weight percent | Polyethylene,[1] Weight percent | Vinyl Stearate polymer,[2] Weight percent |
|---|---|---|---|
| I | 100 | | |
| II | 99.95 | 0.05 | |
| III | 99.95 | | 0.05 |
| IV | 99.925 | 0.05 | 0.025 |
| V | 99.9 | 0.05 | 0.05 |

[1] Epolene D E (average molecular weight 2,000).
[2] Kyrax A (average molecular weight 90,000).

The following data were obtained:

| Blend | Gloss Initial | Gloss 7 days | Cloud Point, °F. |
|---|---|---|---|
| I | 37 | 17 | none |
| II | 39 | 32 | 165 |
| III | 29 | 22 | none |
| IV | 35 | 29 | none |
| V | 35 | 31 | none |

The above data show that wax blends containing the combination of small amounts of low molecular weight polyethylene and of relatively high molecular weight vinyl stearate polymer substantially improve the gloss stability of waxed paper prepared therefrom. An unexpected and surprising benefit is also noted for Blends IV and V. And that is the elimination of haze or cloud from said blends. On the other hand, Blend II containing polyethylene as the sole additive was hazy or cloudy.

It will be apparent to the skilled individual that paper coatings prepared in accordance with the present invention have superior physical and functional properties. Noticeable improvement is found in gloss stability of and the absence of haze in such coatings. A further benefit is the simplified procedure for preparing such coating compositions.

Percentages given herein and in the claims are weight percentages unless otherwise stated.

Although the present invention has been described with reference to specific embodiments thereof, the invention is not to be considered as limited thereto but includes within its scope such modification and variations as come within the spirit of the claims.

I claim:

1. A wax composition consisting essentially of: (a) paraffin wax having a melting point from about 120 to about 145° F., (b) a low molecular weight polyethylene having an average molecular weight from about 1,000 to about 2,500, (c) polyvinylstearate having a molecular weight of from about 85,000 to about 95,000, said polyethylene being present in an amount of at least about 0.05% and said polyvinylstearate being present in an amount of at least about 0.01% and the total amount of said polyethylene and said polyvinylstearate being from about 0.06% to about 0.1%.

2. Composition of claim 1 wherein the paraffin wax has a melting point of about 135/137° F.

3. Composition of claim 1 wherein the polyethylene has an average molecular weight of about 2,000.

4. Composition of claim 1 wherein the polyvinylstearate has an average molecular weight of about 90,000.

5. A wax composition consisting essentially of: (a) about 99.9% by weight of a paraffin wax having a melting point of about 135/137° F., (b) about 0.05% by weight of polyethylene having an average molecular weight of about 2,000, and (c) about 0.05% by weight of polyvinylstearate having an average molecular weight of about 90,000.

6. A wax coated sheet material comprising a base sheet of cellulosic material and a superficial film of the wax composition as defined by claim 1.

References Cited by the Examiner

UNITED STATES PATENTS

| | | | |
|---|---|---|---|
| 2,638,459 | 5/53 | Bowman et al. | 260—28.5 |
| 2,961,346 | 11/60 | Dereich | 260—28.5 |
| 2,988,528 | 6/61 | Tench et al. | 260—28.5 |

OTHER REFERENCES

Smith: Vinyl Resins, Reinhold Publishing Corp., N.Y., Ch. 1, pages 20 and 21, 1958, TP986V48S55 C.2.

ALEXANDER H. BRODMERKEL, *Primary Examiner.*

MORRIS LIEBMAN, ALPHONSO D. SULLIVAN, *Examiners.*